(12) United States Patent
Watanabe (10) Patent No.: US 8,934,130 B2
(45) Date of Patent: Jan. 13, 2015

(54) IMAGE FORMING METHOD INCLUDING EXCEPTION PAGE PROCESSING

(75) Inventor: Yoichiro Watanabe, Osaka (JP)

(73) Assignee: KYOCERA Document Solutions Inc. (JP)

( * ) Notice: Subject to any disclaimer, the term of this patent is extended or adjusted under 35 U.S.C. 154(b) by 110 days.

(21) Appl. No.: 13/557,766

(22) Filed: Jul. 25, 2012

(65) Prior Publication Data

US 2013/0027749 A1 Jan. 31, 2013

(30) Foreign Application Priority Data

Jul. 28, 2011 (JP) ................ P2011-165301

(51) Int. Cl.
*G06K 15/00* (2006.01)
*G06K 15/02* (2006.01)
*H04N 1/23* (2006.01)

(52) U.S. Cl.
CPC ........ *G06K 15/1822* (2013.01); *G06K 15/1825* (2013.01); *H04N 1/233* (2013.01); *H04N 1/2384* (2013.01); *H04N 2201/0094* (2013.01)
USPC ........ 358/1.18; 358/1.15; 358/1.19; 358/537; 399/408

(58) Field of Classification Search
CPC ................ B65H 2301/163; B65H 2301/164; B65H 2301/4505; B42C 19/00; H04N 1/00639; B42D 1/00
USPC ................ 358/1.18, 1.15, 1.19, 537; 399/408
See application file for complete search history.

(56) References Cited

U.S. PATENT DOCUMENTS

| 2005/0232656 A1* | 10/2005 | Asai et al. ...................... 399/130 |
| 2006/0279780 A1* | 12/2006 | Anno et al. ................... 358/1.15 |
| 2011/0179961 A1* | 7/2011 | Yanagawa ..................... 101/483 |

FOREIGN PATENT DOCUMENTS

| JP | 06072065 A | * 3/1994 | ............... B42C 1/12 |
| JP | A-06-072065 | 3/1994 | |
| JP | A-11-216924 | 8/1999 | |
| JP | 2000-151977 | 5/2000 | |
| JP | A-2000-211803 | 8/2000 | |
| JP | 2003-046761 | 2/2003 | |

* cited by examiner

*Primary Examiner* — Jacky X Zheng
(74) *Attorney, Agent, or Firm* — Ostrolenk Faber LLP (57) ABSTRACT

An image forming device includes an assignment unit that detects a size of a document image to be printed in each page for each one of a plurality of pages assigned to a plurality of print sheets that configure a booklet and, in a case where it is determined that a second document image larger than a first document image is present, assigns a page that includes the second document image to a face of a print sheet that is positioned on an outermost face or an innermost face of the booklet as an exception page and a print image generating unit that generates print images by sorting the plurality of pages that include the exception page assigned by the assignment unit.

5 Claims, 7 Drawing Sheets

IMAGE FORMING METHOD INCLUDING EXCEPTION PAGE PROCESSING

Priority is claimed on Japanese Patent Application No. 2011-165301, filed Jul. 28, 2011, the content of which is incorporated therein by reference.

BACKGROUND OF THE DISCLOSURE

1. Field of the Disclosure

The present disclosure relates to an image forming device and an image forming method.

2. Description of Related Art

In image forming devices such as a copying machine, a printer, a facsimile, or a multifunction device that combines the functions of the above-described devices, and the like, in order to improve user convenience or increase added value, implementation of multiple functions has progressed.

For example, most recent image forming devices have a booklet printing function in which a print sheet as a recording medium, on which an image is formed is saved, and reading can be conveniently performed by properly forming a double-sided printed material and the like.

Here, the booklet printing function is a function for generating a booklet that is similar to a book, and, more particularly, a function in which the page layout is automatically calculated by sorting pages to be printed, and data is printed on both faces of print sheets in an aggregated manner.

In a device in which a finisher capable of saddle stitching or center binding is mounted among image forming devices having the booklet printing function, a printed material that has been printed using the booklet printing function of the image forming device is output in a state of being stapled with a stapler, and the printed material is further output in a state of being folded at the center.

Even in a case where the above-described booklet printing function is not used, the generation of a booklet can be performed by a user sorting pages or calculating the page layout in a manual manner.

However, in a case where the booklet is manually formed, complicated page proportions are necessary, and it is necessary for a user to perform an extremely complicated operation.

Accordingly, a booklet printing function in which a booklet can easily be generated is an extremely remarkable function.

In the near further, it is considered that demand for printing electronic books as booklets and reading the booklets will increase in accordance with widespread use of electronic books.

Therefore, the booklet printing function is considered as a function that will play a more important role than it has done previously.

With respect to the booklet printing function, a technique for generating a booklet in which, in a case where there are both left and right pages, an image of both the left and right pages is divided at the center and is assigned to the left and right pages, and the divided images are compensated such that a bent portion between the left and right pages does not become a blank space is known.

In addition, a technique for generating a booklet in which a closing side and the page order are determined in accordance with the direction of a document to be printed and the content of the document (a distinction between vertical writing and horizontal writing) is known.

In a case where a booklet is generated using the above-described booklet printing function, the outermost face and the innermost face need to be handled in a special manner.

The reason for this is that, unlike the other faces, the two pages of both the left and right faces are continuously displayed, and accordingly, a corresponding image does not need to be divided and displayed as two pages.

Here, the outermost face represents a face that is the cover sheet and the back cover sheet of the booklet, and the innermost face represents a face that is stapled to the innermost side of the booklet (more specifically, in a case where the booklet is stapled with a stapler, a face at which the needles of the stapler are stopped).

Accordingly, on the outermost face and the innermost face, a space of an inner margin (a portion that is stapled so as to be combined) is unnecessary, and can be used for page division of a layout in which two pages are connected.

However, according to a general technique, basically, all the pages are handled in the same manner, and accordingly, it is impossible to perform page division of the layout of a booklet by connecting two pages for the outermost face and the innermost face only, unlike the description presented above.

Accordingly, generally, for example, even in a case where a user generates an innermost face having the layout in which two pages are connected, the whole innermost face is printed at a reduced scale (for example, A4 size paper (corresponding to two sheets of A5 size paper) is printed on one page having A5 size paper at a reduced scale) such that the whole inner face enters one page, and there is a problem in that the booklet printing function feature cannot be utilized.

The present disclosure is in view of the above-described circumstances, and an object thereof is to provide an image forming device and an image forming method capable of printing the outermost face and the innermost face of a booklet in a layout that can be configured more freely than that according to a general technique.

SUMMARY OF THE DISCLOSURE

In order to solve the above-described problems, according to a first aspect of the present disclosure, there is provided an image forming device including: an assignment unit that detects a size of a document image to be printed in each page for each one of a plurality of pages assigned to a plurality of print sheets that configure a booklet and, in a case where it is determined that a second document image larger than a first document image is present, assigns a page that includes the second document image to a face of a print sheet that is positioned on an outermost face or an innermost face of the booklet as an exception page; and a print image generating unit that generates print images by sorting the plurality of pages that include the exception page assigned by the assignment unit.

In the image forming device according to the first aspect of the present disclosure, it is preferable that, when the plurality of pages including the exception page are sorted, the print image generating unit assign at least two pages out of the plurality of pages other than the exception page to one face of the print sheet.

In addition, in the image forming device according to the first aspect of the present disclosure, it is preferable that the print image generating unit assign the exception page to one face of the print sheet and sort the plurality of pages including the exception page.

Furthermore, in the image forming device according to the first aspect of the present disclosure, it is preferable that the print image generating unit sort the plurality of pages such that an order of at least the plurality of pages other than the exception page corresponds to an order of document images in a case where the print sheets on which the print images are printed are bound in the booklet.

In addition, in the image forming device according to the first aspect of the present disclosure, it is preferable that the print sheets be configured to be designated such that the print sheet that is used for printing the exception page assigned to the outermost face or the innermost face of the booklet by the assignment unit is different from the print sheets used for printing the other pages.

According to a second aspect of the present disclosure, there is provided an image forming method including: detecting a size of a document image to be printed in each page for each one of a plurality of pages assigned to a plurality of print sheets that configure a booklet and, in a case where it is determined that a second document image larger than a first document image is present, assigning a page that includes the second document image to a face of a print sheet that is positioned on an outermost face or an innermost face of the booklet as an exception page; generating print images by sorting the plurality of pages that include the assigned exception page; and printing the generated print images on the print sheets.

According to the present disclosure, a size of a document image to be printed in each page is detected for each one of a plurality of pages assigned to a plurality of print sheets that configure a booklet and, in a case where it is determined that a document image (second document image) larger than the other document images is present in the detected document images, a page that includes the large document image to a face that is positioned on an outermost face or an innermost face of the booklet as an exception page, and print images are generated by sorting the plurality of pages that include the assigned exception page.

Therefore, according to the present disclosure, the outermost face and the innermost face of the booklet can be printed in a layout that can be configured more freely than that according to a conventional technique.

DETAILED DESCRIPTION OF THE DISCLOSURE

Hereinafter, an image forming device and an image forming method according to embodiments of the present disclosure will be described in detail with reference to the drawings.

Hereinafter, an example will be described in which the image forming device is a multifunction device.

Figure 1:
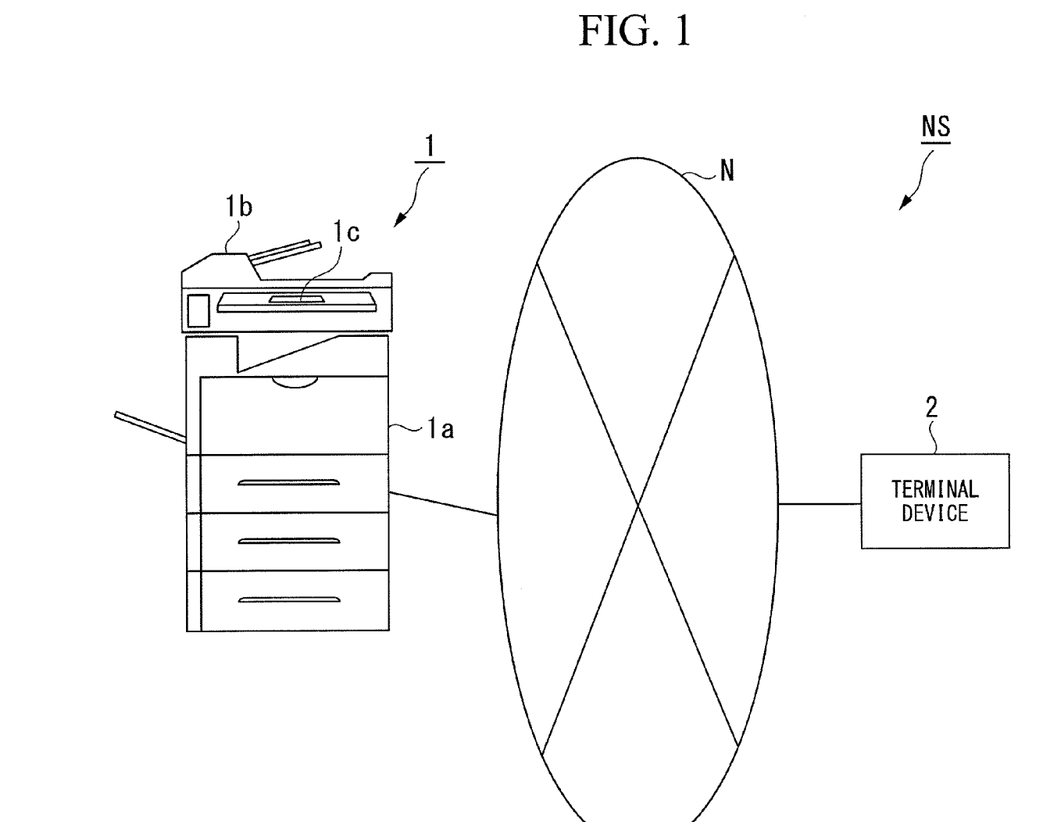
FIG. 1 is a block diagram that illustrates a schematic configuration of a network system in which a multifunction device as an image forming device according to an embodiment of the present disclosure is used.

FIG. 1 is a block diagram that illustrates a schematic configuration of a network system in which the multifunction device as the image forming device according to an embodiment of the present disclosure is used.

As illustrated in FIG. 1, the network system NS has a configuration in which a multifunction device 1 and a terminal device 2 are interconnected through a network N, and various kinds of data (for example, document image data) can be transmitted between the multifunction device 1 and the terminal device 2.

The multifunction device 1 includes a main body unit 1a, a scanner unit 1b, an operation display panel 1c, and the like and has a combination of a copying function, a printing function, and a facsimile transmission/reception function.

The multifunction device 1 can communicate with the terminal device 2 in two ways through the network N.

More specifically, the multifunction device 1 can print document image data that is transmitted from the terminal device 2, transmit the document image data that is read out by the scanner unit 1b to the terminal device 2, and the like.

In addition, a booklet printing function to be described later in detail is installed in the multifunction device 1.

The terminal device 2 is configured by a computer such as a personal computer (PC) that includes a central processing unit (CPU), a memory, a hard disk, a display, and the like.

The terminal device 2 can generate document image data to be printed by the multifunction device 1, instruct the multifunction device 1 to perform a printing operation, receive the document image data that is transmitted from the multifunction device 1, and the like.

In addition, the terminal device 2 can instruct the multifunction device 1 to perform a printing operation using a booklet printing function as a printing instruction for the multifunction device 1, which will be described later in detail.

The network N, for example, is configured by the Internet, a local area network (LAN), or the like.

Figure 2:
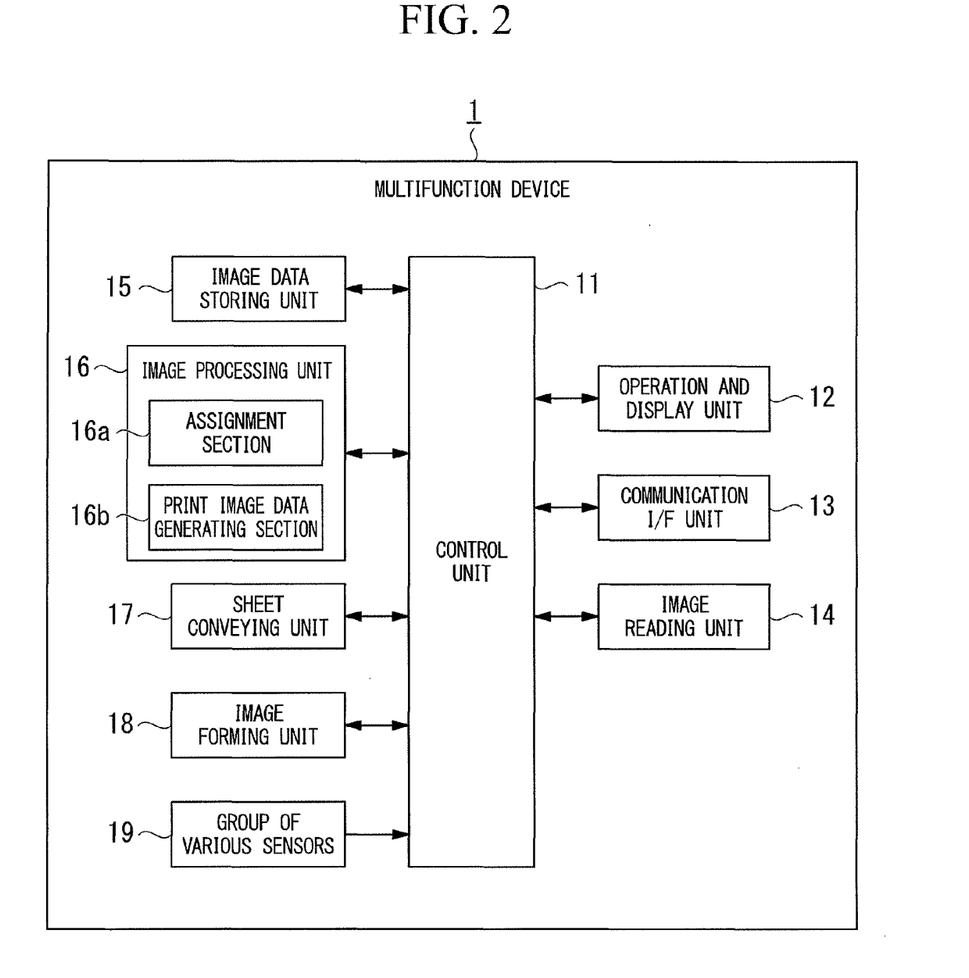
FIG. 2 is a block diagram that illustrates the configuration of a main portion of a multifunction device as an image forming device according to an embodiment of the present disclosure.

FIG. 2 is a block diagram that illustrates the configuration of a main portion of a multifunction device as an image forming device according to an embodiment of the present disclosure.

As illustrated in FIG. 2, the multifunction device 1 includes a control unit 11, an operation and display unit 12, a communication I/F unit 13, an image reading unit 14, an image data storing unit 15, an image processing unit 16, a sheet conveying unit 17, an image forming unit 18, and a group 19 of various sensors.

The control unit 11 controls the operation of the multifunction device 1 in accordance with an operation instruction that is input from the operation and display unit 12 or various instructions that are input from the communication I/F unit 13 while referring to various detection signals output from the group 19 of various sensors.

More specifically, the control unit 11, for example, performs control of the image reading unit 14 to read the document image data, control of the communication I/F unit 13 to receive the document image data, controlling the printing of the document image data that is stored in the image data storing unit 15, and the like.

In addition, in a case where a printing instruction that is transmitted from the terminal device 2 or a printing instruction that is input from the operation display panel 1c is a printing instruction for the intention of printing using the above-described booklet printing function, the control unit 11 realizes the booklet printing function using controlling the image processing unit 16, the sheet conveying unit 17, and the image forming unit 18.

In addition, the controlling method will be described later in detail.

The operation and display unit 12 includes the operation display panel 1c illustrated in FIG. 1 and various operation keys, outputs the content of an operation for the operation display panel 1c or various operation keys to the control unit 11, and displays various types of information on the operation display panel 1c under the control of the control unit 11.

Examples of the various operation keys included in the operation and display unit 12 include a copying function switching key, a printing function switching key, a scanning function switching key, a facsimile function switching key, a start key, a stop/clear key, a power key, and numeric keys (number input keys).

In addition, the copying function switching key, the printing function switching key, the scanning function switching key, and the facsimile function switching key described above are keys that are used for switching the multifunction device 1 to the operation mode of each function in a case where the function is used by a user.

In addition, the key that is used for an instruction for printing using the above-described booklet printing function is prepared, for example, using a software key and is displayed on the operation display panel 1c.

The communication I/F unit 13 is connected to the network N illustrated in FIG. 1 and transmits/receives various signals to/from the terminal device 2 through the network N.

The image reading unit 14 includes the scanner unit 1b (see FIG. 1) in which an automatic document feeder (ADF) and a charge coupled device (CCD) sensor, and the like are disposed, allows the CCD sensor to read out images of documents that are sequentially fed by the ADF, and outputs image data of the documents based on the images of the documents.

In addition, the document image data output from the image reading unit 14 is stored in the image data storing unit 15 through the control unit 11.

The image data storing unit 15, for example, is configured by a hard disk drive and stores various kinds of data under the control of the control unit 11.

For example, image data such as the document image data received by the communication I/F unit 13 from the terminal device 2 through the network N or image data for which image processing has been performed by the image processing unit 16 is temporarily stored.

The image processing unit 16 performs a variety of image processing for the image data that is stored in the image data storing unit 15 under the control of the control unit 11.

For example, a compressing/decompressing process of the image data, a process of calculating the printing rate of the image data, or the like is performed.

In addition, the image processing unit 16 includes an assignment section 16a (assigning means) and a print image data generating section 16b (print image generating means) and, in a case where an instruction for printing using the above-described booklet printing function is received from the terminal device 2, generates print image data that is used for printing an image (print image) used for generating a booklet.

The assignment section 16a detects the size of a document image for each page for document image data for which a printing instruction has been received from the terminal device 2 and, in a case where it is determined that, among detected document images, there is a document image (second document image) larger than the other document images (first document images), assigns a page including the large document image to a face that is positioned on the outermost face or the innermost face of a booklet as an exception page.

For example, in a case where the number of document images represented by the document image data is seven pages, the size of the document images of six pages of the seven pages is A5 size paper, and the size of the document image of the remaining page is A4 size paper, the assignment section 16a assigns the page of A4 size paper to a face that is positioned on the outermost face or the innermost face of a booklet as an exception page.

In addition, it is set whether the exception page is assigned to the outermost face or the innermost face of the booklet based on, for example, a user's instruction.

The print image data generating section 16b generates print image data by sorting the order of document images, which includes the exception page assigned by the assignment section 16a, represented by the document image data so as to be printed in the page order defined in advance.

Here, when the order of the document images is sorted, the print image data generating section 16b performs a process of assigning at least two pages of a plurality of pages other than the above-described exception page to one face of a print sheet.

Also, the above-described exception page is assigned to one face of a print sheet, for example, the exception page is assigned to both the left and right two pages of the booklet and a plurality of pages including the exception page are sorted.

In addition, in a case where print sheets on which print images represented in the print image data have been printed are bound in a booklet, the print image data generating section 16b sorts the order of pages such that the order of at least pages other than the exception page corresponds to the order of document images.

Furthermore, depending on the order of document images, the order of pages may be sorted such that the order of all the pages including the exception page corresponds to the order of document images.

The sheet conveying unit 17 includes conveying rollers, a motor for driving the conveying rollers, and the like and conveys a print sheet housed in a sheet feeding cassette to the image forming unit 18.

In addition, the print sheet for which an image forming process has been performed by the image forming unit 18 is conveyed to a sheet discharging tray.

The image forming unit 18 performs the image forming process under the control of the control unit 11 by using image data such as the document image data or the print image data that is stored in the image data storing unit 15.

More specifically, a toner image according to the various types of image data described above is formed, the formed toner image is transferred to a print sheet that is conveyed from the sheet conveying unit 17, and the toner image that is transferred to the print sheet is fixed.

The group 19 of various sensors represents various sensors that are necessary for performing an image forming operation such as an out-of-paper detecting sensor, a paper jam detecting sensor, a sheet position detecting sensor, and a temperature sensor and outputs various kinds of information that is detected by each sensor to the control unit 11 as a detection signal.

Next, the operation of the multifunction device 1 having the above-described configuration will be described in detail.

Figure 3:
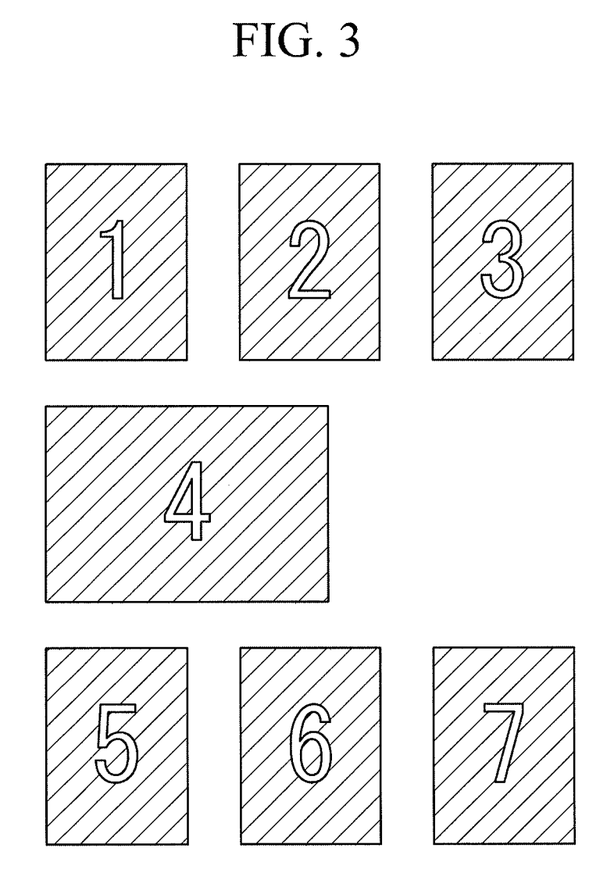
FIG. 3 is a diagram that illustrates an example of a document image to be printed by a multifunction device according to an embodiment of the present disclosure.

FIG. 3 illustrates an example of a document image to be printed by the multifunction device according to an embodiment of the present disclosure.

In FIG. 3, a number, which is represented on each page, written in white represents the page number of a document image.

The document images illustrated in FIG. 3 are configured so as to form a total of seven pages. The sizes of first to third pages and fifth to seventh pages correspond to A5 size paper, and the size of fourth page only corresponds to A4 size paper.

In other words, the document images illustrated in FIG. 3 are generated such that the fourth page forms both left and right faces of a booklet.

Figure 4:
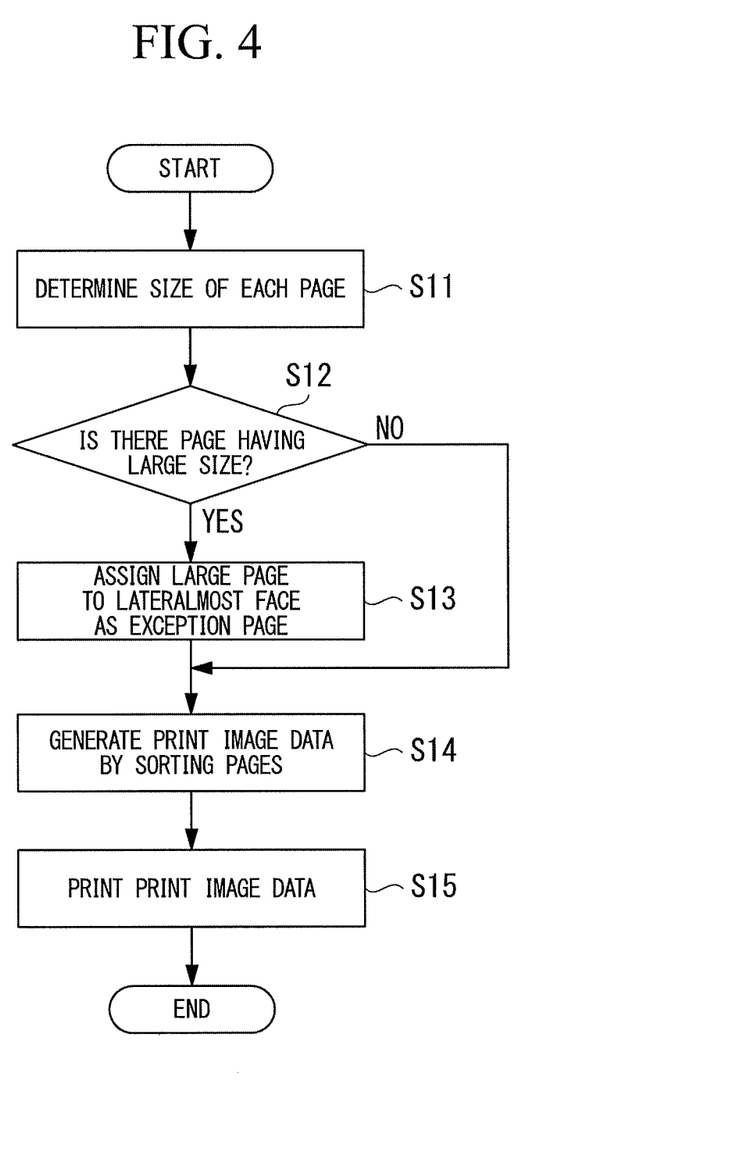
FIG. 4 is a flowchart that illustrates the operation of a multifunction device according to an embodiment of the present disclosure.

FIG. 4 is a flowchart that illustrates the operation of a multifunction device according to an embodiment of the present disclosure.

The process illustrated in FIG. 4 is started when a printing instruction is transmitted to the multifunction device 1 from the terminal device 2 through the network N.

Alternatively, in a state in which the copying function switching key disposed on the operation and display unit 12 is operated, and the copying function is effective, a user sets a document in the ADF that is disposed in the image reading unit 14 and performs an instruction for starting a copy operation by operating a start key that is disposed on the operation and display unit 12, whereby the process is started.

Hereinafter, a case will be described as an example in which a printing instruction that is used for printing document images illustrated in FIG. 3 is transmitted from the terminal device 2.

Figure 5:
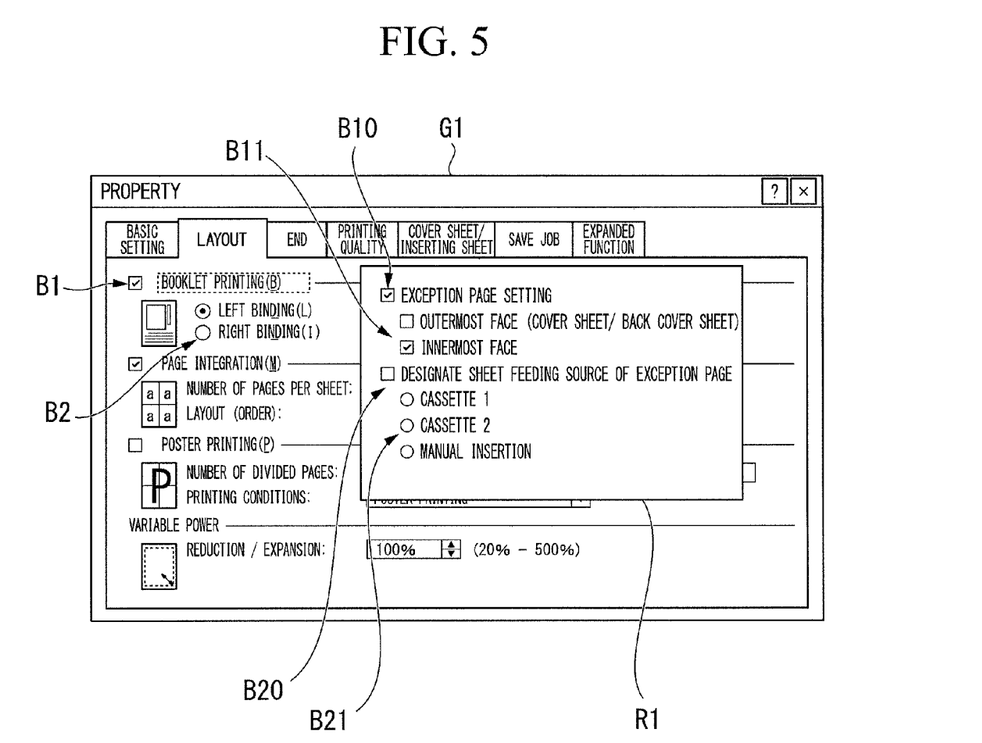
FIG. 5 is a diagram that illustrates an example of a printing setting screen that is displayed in a multifunction device according to an embodiment of the present disclosure.

Here, before the user operating the terminal device 2 performs a printing instruction for the multifunction device 1, a setting screen G1 illustrated in FIG. 5 is displayed in the terminal device 2, whereby booklet printing to be performed by the multifunction device 1 can be set.

FIG. 5 is a diagram that illustrates an example of a printing setting screen that is displayed in the multifunction device according to an embodiment of the present disclosure.

On the setting screen G1 illustrated in FIG. 5, a check box B1 that indicates whether or not booklet printing is performed, a radio button B2 that is used for alternatively selecting a binding direction (left binding or right binding) in a case where booklet printing is performed, and a setting area R1 for an exception page are displayed.

The setting area R1 is displayed only in a case where the check box B1 is checked, and a page is present for which the size of a document image to be printed is larger than that of the other pages.

In the setting area R1, a check box B10 that is used for indicating whether or not an exception page is assigned and set and a check box B20 that is used for indicating whether or not a sheet feeding source (sheet feeding source of a print sheet) is set for the exception page are disposed.

In addition, a check box B11 is disposed, which is used for indicating whether an exception page is assigned to the outermost face or the innermost face in a case where the check box B10 is checked (in a case where there is an instruction for setting an exception page) in addition to the check box B10.

Furthermore, a radio button B21 is disposed, which is used for alternatively selecting one of "cassette 1", "cassette 2", and "manual insertion" as a sheet feeding source in a case where the check box B20 is checked (in a case where there is an instruction for setting a sheet feeding source for an exception page) in accompaniment with the check box B20.

In FIG. 5, the check box B1 is checked by a user, "left binding" is selected using the radio button B2, the check box B10 of the setting area R1 is checked, and an instruction for assigning an exception page to the innermost face is made using the check box B11.

In a case where the user checks the check box B20 and performs an operation for selecting the sheet feeding source through the radio button B21, a print sheet that is used for printing the exception page can be set to a sheet that is different from print sheets that are used for printing the other pages.

For example, it may be set such that the print sheets used for printing pages other than the exception page are set to normal print sheets (white print sheets), and only the print sheet that is used for printing an exception page is set to a color sheet.

In addition, in FIG. 5, for simplification of the description, the check box B20 is not checked.

When a printing instruction transmitted from the terminal device 2 through the network N is received by the multifunction device 1, document image data that is included in the printing instruction is temporarily stored in the image data storing unit 15, and the process illustrated in FIG. 4 is started.

When the process is started, the document image data stored in the image data storing unit 15 is read out by the control unit 11 and is output to the image processing unit 16.

Then, the size of a document image that is represented by the document image data is determined for each page by the assignment section 16a of the image processing unit 16 in Step S11, and it is determined whether or not a page for which the size of the document image is larger that of the other pages is present in Step S12.

In a case where a printing instruction representing that the document image illustrated in FIG. 3 is to be printed is transmitted from the terminal device 2, there is a fourth page of A4 size paper hat is larger than the size (A5 size paper) of the other pages (first to third pages and fifth to seventh pages) in the document image illustrated in FIG. 3, and accordingly, the determination result of Step S12 is "Yes".

Then, the assignment section 16a performs the process of assigning the fourth page to the outermost face (the innermost face) as an exception page in Step S13 (first step).

On the other hand, in a case where the determination result of Step S12 is "No", the process of Step S13 is omitted.

In a case where the process of Step S13 is performed or a case where the determination result of Step S12 is "No", the process of generating print image data by sorting the order of document images for printing a booklet is performed by the print image data generating section 16b of the image processing unit 16 in Step S14 (second step).

After the generated print image data is read out by the control unit 11 and is temporarily stored in the image data storing unit 15, the print image data is read out by the control unit 11 again and is transmitted to the image forming unit 18.

In addition, in a case where the print image data does not need to be stored in the image data storing unit 15, the print image data generated by the image processing unit 16 may be directly transmitted to the image forming unit 18.

When the print image data is input to the image forming unit 18, printing for a print sheet is performed in Step S15 (third step).

Specifically, the conveying of the print sheet is started by the sheet conveying unit 17.

In addition, the formation of a toner image according to the print image data is started by the image forming unit 18.

When the toner image is formed by the image forming unit 18, the toner image is transferred to a print sheet that is conveyed by the sheet conveying unit 17, whereby the toner image is fixed.

The print sheet on which the toner image is fixed is conveyed to the sheet discharging tray by the sheet conveying unit 17.

In this way, the print image data is printed.

Here, when the number of pages configured by the document image is P, and the number of print sheets for which printing is performed through booklet printing is N, there is the following relation.

When P can be divided by four, $$N=P/4$$

When P cannot be divided by four, $$N=\text{(Quotient (only an integer part) of } P/4)+1$$

In a case where all the pages of the document image data have the same size, the determination result of Step S12 is "No", and, through the process of Step S14, print image data is generated for which the following pages are printed on the front and rear sides of the document image for an n-th ($1 \leq n \leq N$) print sheet.

Front Side: (2n−1)-th page and (4N−2n+2)-th page
Rear Side: (4N−2n+1)-th page and (2n)-th page For example, in a case where the number of pages configured by the document image is eight, the size of all the pages is A5 size paper, and an instruction for printing a booklet for binding left side of papers is made, as illustrated below, printing is performed for two print sheets.
First Print Sheet
Left On Front Side: 8th Page/Right On Front Side: 1st Page
Left On Rear Side: 2nd Page/Right On Rear Side: 7th Page
Second Print Sheet
Left On Front Side: 6th Page/Right On Front Side: 3rd Page
Left On Rear Side: 4th Page/Right On Rear Side: 5th Page Here, in a case where two print sheets illustrated in the above-described example are bound into a booklet, the rear side (the side on which the fourth and fifth pages are printed) of the second print sheet becomes the innermost face.

In this embodiment, like the fourth page of the document image illustrated in FIG. 3, in a case where there is a page for which the size of the document image is larger than that of the other pages (in a case where the determination result of Step S12 is "Yes"), the page for which the document image is large is assigned to the innermost face as an exception page in Step S13, and a counting process is performed by determining that the number of pages occupied by the exception page is two.

Thereafter, the print image data is generated by sorting the order of pages in Step S14, and the process of printing print images corresponding to the print image data on print sheets is performed in Step S15.

Figure 6A:
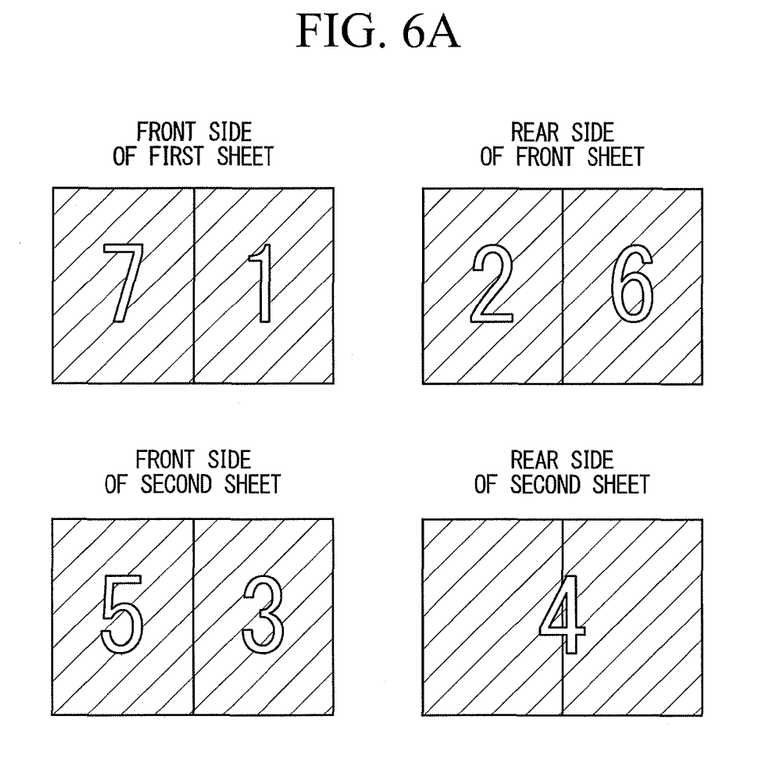
FIG. 6A is a diagram that illustrates a printing result of a multifunction device according to an embodiment of the present disclosure.
Figure 6B:
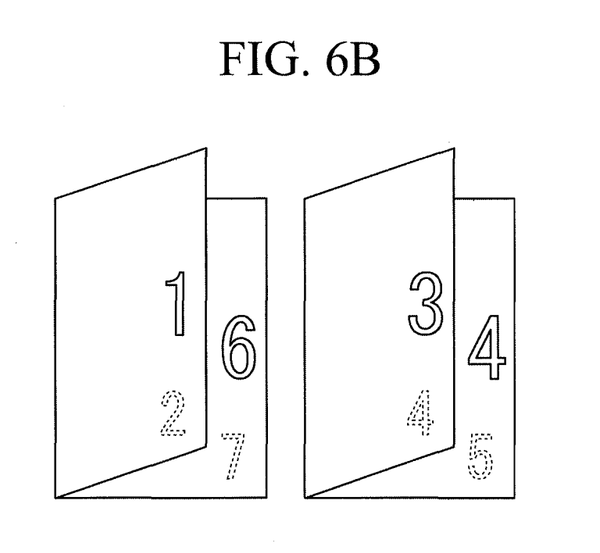
FIG. 6B is a diagram that illustrates a printing result of a multifunction device according to an embodiment of the present disclosure.

By performing the above-described processes, print sheets on which the print images illustrated in FIGS. 6A and 6B are printed are discharged from the multifunction device 1.

FIGS. 6A and 6B illustrate the printing results of the multifunction device according to an embodiment of the present disclosure. FIG. 6A illustrates a print sheet that is discharged from the multifunction device, and FIG. 6B illustrates the appearance of binding the print sheets into a booklet.

As illustrated in FIG. 6A, the document images illustrated in FIG. 3 are printed as below on two print sheets.
First Print Sheet
Left On Front Side: 7th Page/Right On Front Side: 1st Page
Left On Rear Side: 2nd Page/Right On Rear Side: 6th Page
Second Print Sheet
Left On Front Side: 5th Page/Right On Front Side: 3rd Page
Rear Side: 4th Page (corresponding to two pages)

The first and second print sheets illustrated in FIG. 6A are bent such that the rear side is arranged on the inner side, and the bent second print sheet is arranged to the inner side of the bent first print sheet, whereby a booklet illustrated in FIG. 6B is bound.

In addition, in FIG. 6B, the page number of a page that appears on the front side of the sheet face is represented by a solid-line number, and the page number of a page that appears on the rear side of the sheet face is represented by a broken-line number.

By referring to FIG. 6B, it can be understood that the page numbers of the booklet are arranged in order so as to be consecutive from "1" to "7".

In addition, it can be understood that the fourth page of the document image illustrated in FIG. 3 is printed over two pages disposed on the innermost face.

Figure 7A:
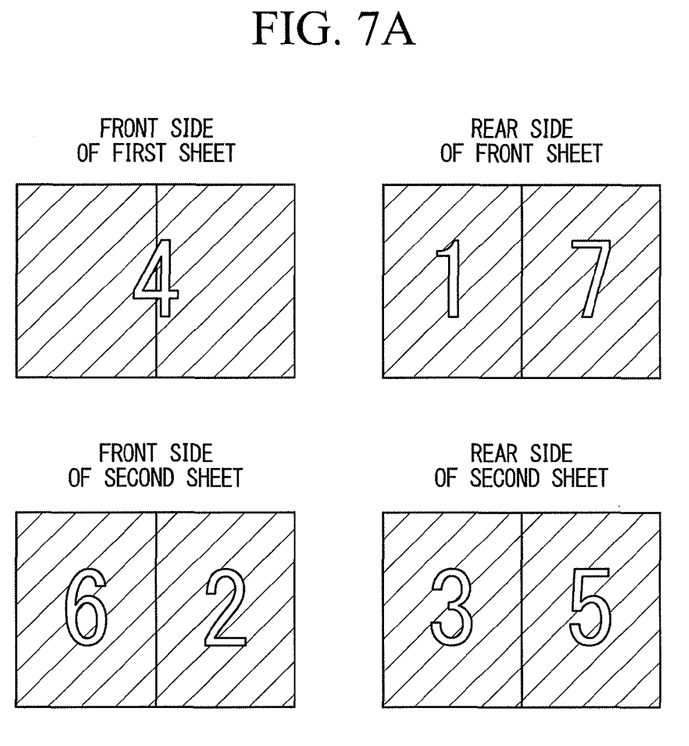
FIG. 7A is a diagram that illustrates another printing result of a multifunction device according to an embodiment of the present disclosure.
Figure 7B:
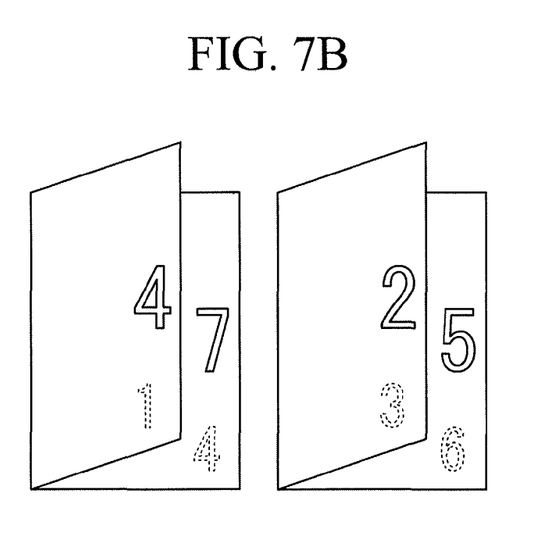
FIG. 7B is a diagram that illustrates another printing result of a multifunction device according to an embodiment of the present disclosure.

FIGS. 7A and 7B illustrate other printing results of a multifunction device according to an embodiment of the present disclosure. FIG. 7A is a diagram that illustrates a print sheet that is discharged from the multifunction device, and FIG. 7B illustrates the appearance of binding the print sheets into a booklet.

FIGS. 7A and 7B illustrate printing results in a case where an exception page is assigned to the outermost face.

In a case where the exception page is assigned to the outermost face, as illustrated in FIG. 7A, the document image illustrated in FIG. 3 is printed as below on two print sheets.
First Print Sheet
Front Side: 4th Page (corresponding to two pages)
Left On Rear Side: 1st Page/Right On Rear Side: 7th Page
Second Print Sheet
Left On Front Side: 6th Page/Right On Front Side: 2nd Page
Left On Rear Side: 3rd Page/Right On Rear Side: 5th Page The first and second print sheets illustrated in FIG. 7A are bent such that the rear side is arranged on the inner side, and the bent second print sheet is arranged to the inner side of the bent first print sheet, whereby a booklet illustrated in FIG. 7B is bound.

In addition, in FIG. 7B, similarly to FIG. 6B, the page number of a page that appears on the front side of the sheet face is represented by a solid-line number, and the page number of a page that appears on the rear side of the sheet face is represented by a broken-line number.

By referring to FIG. 7B, it can be understood that the fourth page of the document image is printed over two pages of the front cover sheet and the back cover sheet.

In addition, it can be understood that the other pages excluding the fourth page are arranged such that the page numbers are arranged in the order of "1" to "3" and "5" to "7".

As above, according to this embodiment, the size of a document image is detected for each page, in a case where it is determined that, among detected document images, there is a document image larger than the other document images, the page including the large document image is assigned to the outermost face or the innermost face of a booklet as an exception page, and the print image data is generated by sorting the order of the document images including the assigned exception page so as to be printed in the page order that is defined in advance.

Accordingly, the outermost face and the innermost face of a booklet can be printed in a layout that can be configured more freely than that according to a conventional technique.

As above, although the image forming device and the image forming method according to the embodiments of the present disclosure have been described, the present disclosure is not limited by the above-described embodiment but can be freely changed in the scope of the present disclosure.

For example, in the above-described embodiment, although an example has been described in which the image forming device according to the present disclosure is the multifunction device, the present disclosure can also be applied to an image forming device such as a printer, a copying machine, or a facsimile.

While preferred embodiments of the disclosure have been described and illustrated above, it should be understood that these are examples of the disclosure and are not to be considered as limiting. Additions, omissions, substitutions, and other modifications can be made without departing from the scope of the present disclosure. Accordingly, the disclosure is not to be considered as being limited by the foregoing description, and is only limited by the scope of the appended claims.

What is claimed is:

1. An image forming method comprising:
   detecting a size of a document image to be printed in each page of a plurality of pages assigned to a plurality of print sheets that configure a booklet;
   only in case both a first user instruction to perform booklet printing is received and a determination is made that a second document image is larger than a first document image, displaying a setting area for setting an exception page,
   setting whether the exception page is assigned to an outermost face or an innermost face based on a second user instruction input into the setting area, and assigning a page that includes the second document image to a face of a print sheet that is positioned on one of the outermost face and the innermost face of the booklet as the exception page based on the second user instruction;
   generating print images by sorting the plurality of pages that include the assigned exception page; and
   printing the generated print images on the print sheets.

2. The image forming method according to claim 1, wherein
   in the generating print images step, at least two pages of the plurality of pages other than the exception page are assigned to one face of the print sheet when the plurality of pages including the exception page are sorted.

3. The image forming method according to claim 2, wherein
   in the generating print images step, the exception page is assigned to one face of the print sheet and the plurality of pages including the exception page are sorted.

4. The image forming method according to claim 1, wherein
   in the generating print images step, the plurality of pages are sorted such that an order of at least the plurality of pages other than the exception page corresponds to an order of document images in a case where the print sheets on which the print images are printed are bound in the booklet.

5. The image forming method according to claim 1, wherein
   the print sheets are configured to be designated such that the print sheet that is used for printing the exception page assigned to the outermost face or the innermost face of the booklet in the assigning step is different from the print sheets used for printing the other pages.

* * * * *